(12) United States Patent
Meyers

(10) Patent No.: US 7,926,599 B2
(45) Date of Patent: Apr. 19, 2011

(54) MOTORIZED BARREL CART

(75) Inventor: Patrick J. Meyers, Crown Point, IN (US)

(73) Assignee: Meydrive, LLC, Crown Point, IN (US)

( * ) Notice: Subject to any disclaimer, the term of this patent is extended or adjusted under 35 U.S.C. 154(b) by 0 days.

(21) Appl. No.: 12/488,057

(22) Filed: Jun. 19, 2009

(65) Prior Publication Data

US 2009/0314555 A1     Dec. 24, 2009

Related U.S. Application Data

(60) Provisional application No. 61/074,835, filed on Jun. 23, 2008.

(51) Int. Cl.
 *B62D 51/04* (2006.01)
(52) U.S. Cl. .............. 180/19.1; 180/65.1; 414/420
(58) Field of Classification Search .......... 180/19.1, 180/65.6, 65.1; 414/420, 444
 See application file for complete search history.

(56) References Cited

U.S. PATENT DOCUMENTS

| | | | | |
|---|---|---|---|---|
| 2,272,447 A | * | 2/1942 | Traxel | 414/450 |
| 2,635,775 A | * | 4/1953 | Ernst | 414/622 |
| 3,052,323 A | * | 9/1962 | Hopfeld | 187/232 |
| 3,278,218 A | * | 10/1966 | Lebre | 294/81.2 |
| 3,984,891 A | | 10/1976 | Weinmann | |
| 4,356,875 A | * | 11/1982 | Clune | 180/13 |
| 4,669,949 A | | 6/1987 | Sutton | |
| 4,741,659 A | * | 5/1988 | Berg | 414/450 |
| 4,981,412 A | | 1/1991 | Hawkins | |
| 5,161,635 A | * | 11/1992 | Kiffe | 180/19.3 |
| 5,207,550 A | | 5/1993 | Lehman | |
| 5,232,065 A | * | 8/1993 | Cotton | 180/11 |
| 5,236,298 A | | 8/1993 | Lehman | |
| 5,303,968 A | | 4/1994 | Trine | |

(Continued)

FOREIGN PATENT DOCUMENTS

JP     51160853     12/1976

(Continued)

OTHER PUBLICATIONS

On-line Valley Craft Product Catalog: www.valleycraft.com.

*Primary Examiner* — Paul N Dickson
*Assistant Examiner* — Tashiana Adams
(74) *Attorney, Agent, or Firm* — Hartman & Hartman, P.C.; Gary M. Hartman; Domenica N. S. Hartman

(57) ABSTRACT

A motorized cart for lifting and transporting a drum. The cart includes a frame defining at its forward end a rearward-extending frame recess for receiving a drum, a feature for engaging the lower end of a drum and supporting the drum within the frame recess, another feature for engaging an upper end of the drum when received in the frame recess, first wheels at the lower extent of the frame, and non-driven wheels above and rearward of the first wheels. At least one of the first wheels is a drive wheel disposed adjacent the left or right side of the frame. A drive system includes a motor, a clutch for selectively engaging the motor with the drive wheel, and a battery for providing power to the motor and clutch. The motor is controlled to vary the rotational speed and direction of the drive wheel, and power from the battery can be controlled to enable the cart to be manually or self-propelled.

17 Claims, 9 Drawing Sheets

U.S. PATENT DOCUMENTS

| | | |
|---|---|---|
| 5,618,154 A | 4/1997 | Irons, Jr. et al. |
| 5,685,385 A | 11/1997 | Sanuga |
| 6,062,328 A * | 5/2000 | Campbell et al. ............ 180/65.6 |
| 6,173,799 B1 * | 1/2001 | Miyazaki et al. ............ 180/19.3 |
| 6,276,470 B1 * | 8/2001 | Andreae et al. ............. 180/19.3 |
| 6,283,238 B1 * | 9/2001 | Royer et al. ................. 180/19.1 |
| 6,909,068 B1 * | 6/2005 | Alleman et al. .............. 219/136 |
| 7,293,619 B2 * | 11/2007 | Mitchell, Jr. ................. 180/19.2 |
| 2006/0207831 A1 * | 9/2006 | Moore et al. ..................... 182/20 |

FOREIGN PATENT DOCUMENTS

| | | |
|---|---|---|
| JP | 2000168569 | 6/2000 |
| JP | 2005170669 | 6/2005 |
| KR | 200148431 | 6/1999 |

* cited by examiner

MOTORIZED BARREL CART

CROSS REFERENCE TO RELATED APPLICATIONS

This application claims the benefit of U.S. Provisional Application No. 61/074,835, filed Jun. 23, 2008, the contents of which are incorporated herein by reference.

BACKGROUND OF THE INVENTION

The present invention generally relates to barrel carts (also known as hand trucks and drum trucks) of the type adapted to lift and transport drums, and more particularly to a barrel cart that is motorized to facilitate the movement of very large drums.

Manually-operated four-wheel barrel carts are known in the hauling and transportation industries. A particular example is a barrel cart manufactured by Valley Craft Inc. under the name FOUR-WHEEL EZY-ROL™ Automatic Drum Truck. Carts of this type may be capable of lifting and moving large drums of conventional sizes (for example, thirty and fifty-five gallons (about 100 to about 200 liters)) that may weigh 1000 pounds (a mass of about 450 kg) or more. Barrel carts are typically equipped with a device for securing a drum to the cart. A typical example is a hook for engaging a drum's chime, which is conventionally present as a protruding annular lip at the top and bottom of a drum and specifically intended to serve as a structural feature to aid in handing a drum with mechanized equipment. Alternatively or in addition, a barrel cart can be equipped with a hook adapted to engage the rim or bung hole projection of a drum, or with cables adapted to wrap around a drum. While two-wheeled barrel carts are available, four-wheeled versions are often preferred for handling larger and heavier drums.

Conventional barrel carts require that an operator manually push the cart, which in the case of very heavy drums can be very tiring to the operator and raise the risk of excessive strain on the operator's back and legs.

BRIEF DESCRIPTION OF THE INVENTION

The present invention provides a motorized cart for lifting and transporting a drum, barrel, or similar object.

According to a first aspect of the invention, the cart includes a frame having upper and lower extents, a forward end and an oppositely-disposed rearward end, and a left side and an oppositely-disposed right side. The frame defines at its forward end a rearward-extending frame recess adapted to receive a drum, and more preferably a drum having a capacity of at least one hundred liters (about thirty gallons). The cart further includes handles disposed at the upper extent of the frame, and lower engaging means disposed at the forward end and the lower extent of the frame for engaging a lower end of a drum received in the frame recess and thereafter lifting and supporting the drum within the frame recess. An upper engaging means is disposed at the forward end of the frame for engaging an upper end of the drum received in the frame recess and supported by the lower engaging means. First wheels are disposed at the lower extent of the frame, of which at least one is a drive wheel disposed adjacent the left or right side of the frame. Non-driven wheels are disposed closer to the upper extent of the frame and closer to the rearward end of the frame than the first wheels, and include left and right non-driven wheels disposed adjacent the left and right sides, respectively, of the frame to define with the first wheels a four-point support for the frame. The cart further includes a drive system comprising a motor supported by the frame and adapted to drive the drive wheel, a clutch supported by the frame and adapted to selectively engage and disengage the motor with the drive wheel, and a battery supported by the frame and adapted to provide power to the motor and to the clutch. Means is provided for controlling the motor to vary the rotational speed and rotational direction of the drive wheel and thereby control the ground speed and travel direction, respectively, of the cart. Means is also provided for selectively delivering and interrupting power from the battery to the motor and to the clutch to enable the cart to be self-propelled by the motor under the control of an operator or manually propelled by an operator.

In view of the above, it can be seen that the invention provides a motorized cart capable of supporting very large containers, and provides the flexibility of operating the cart manually or under the power of a motor to self-propel the cart in both the forward and rearward directions. The cart also provides multiple alternatives for providing stable multi-point supports for the frame.

Other aspects and advantages of this invention will be better appreciated from the following detailed description.

DETAILED DESCRIPTION OF THE INVENTION

Figure 1:
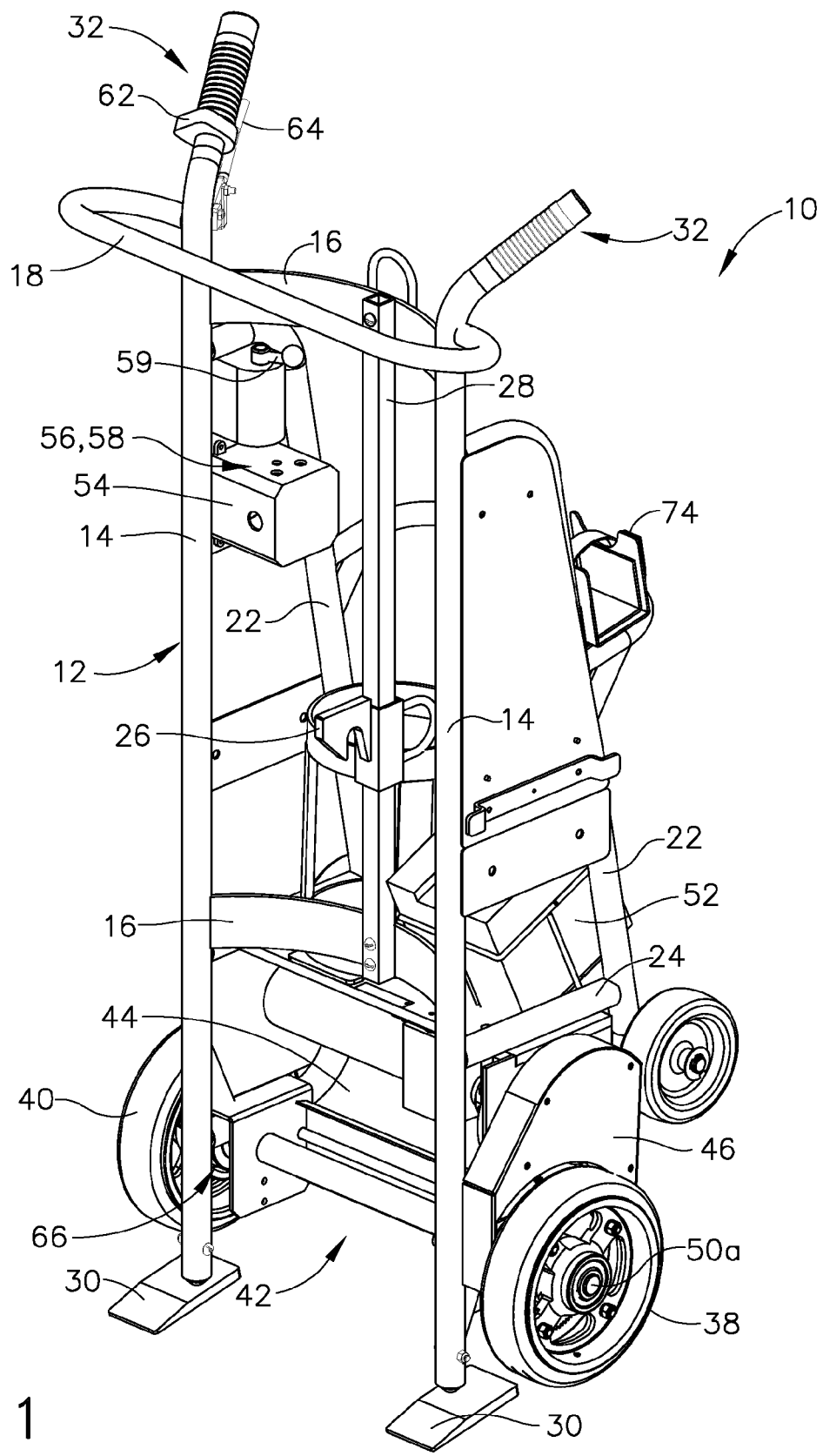
FIG. 1 is a front perspective view of a motorized barrel cart in accordance with a preferred embodiment of this invention.
Figure 2:
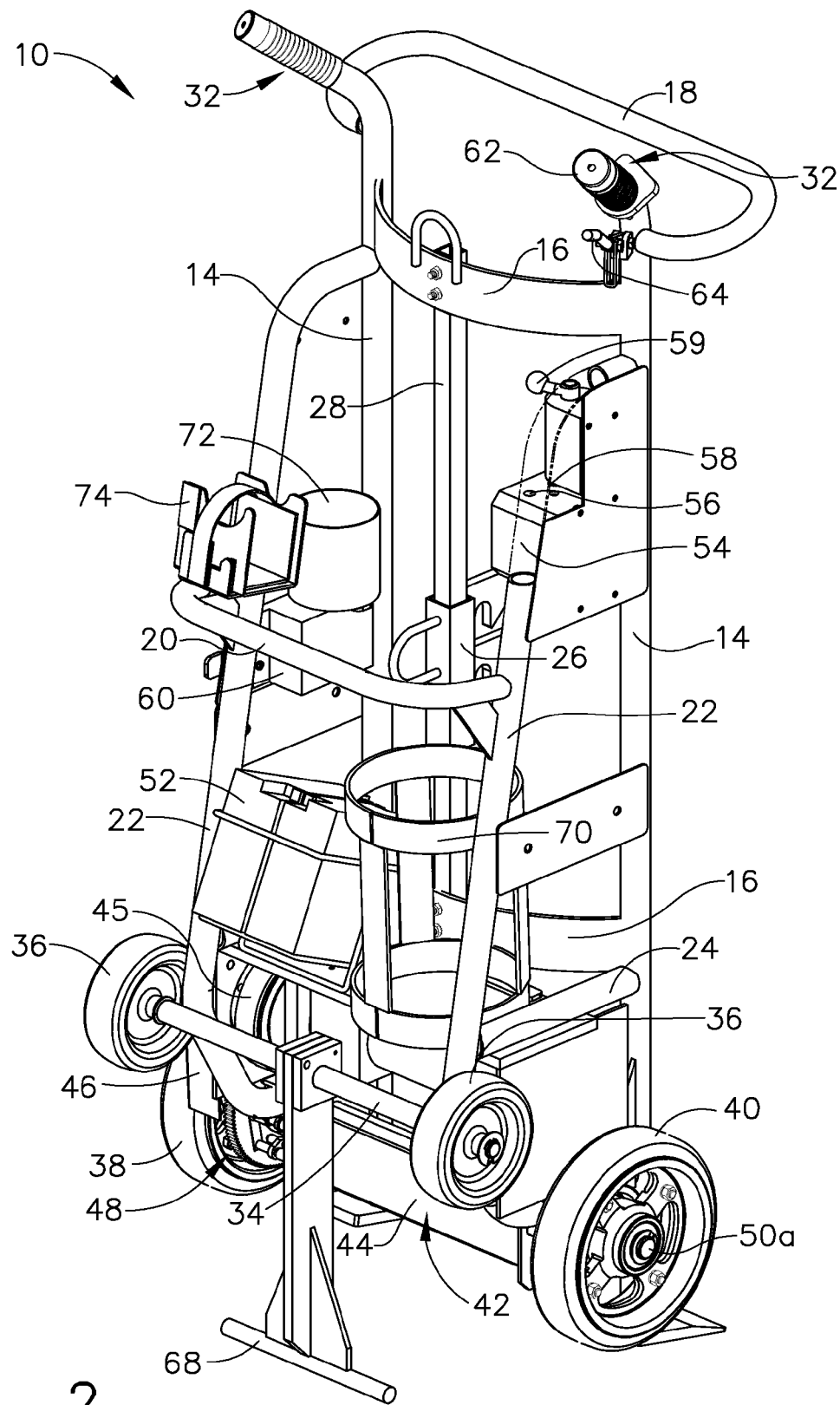
FIG. 2 is a rear perspective view of a motorized barrel cart in accordance with a preferred embodiment of this invention.
Figure 3:
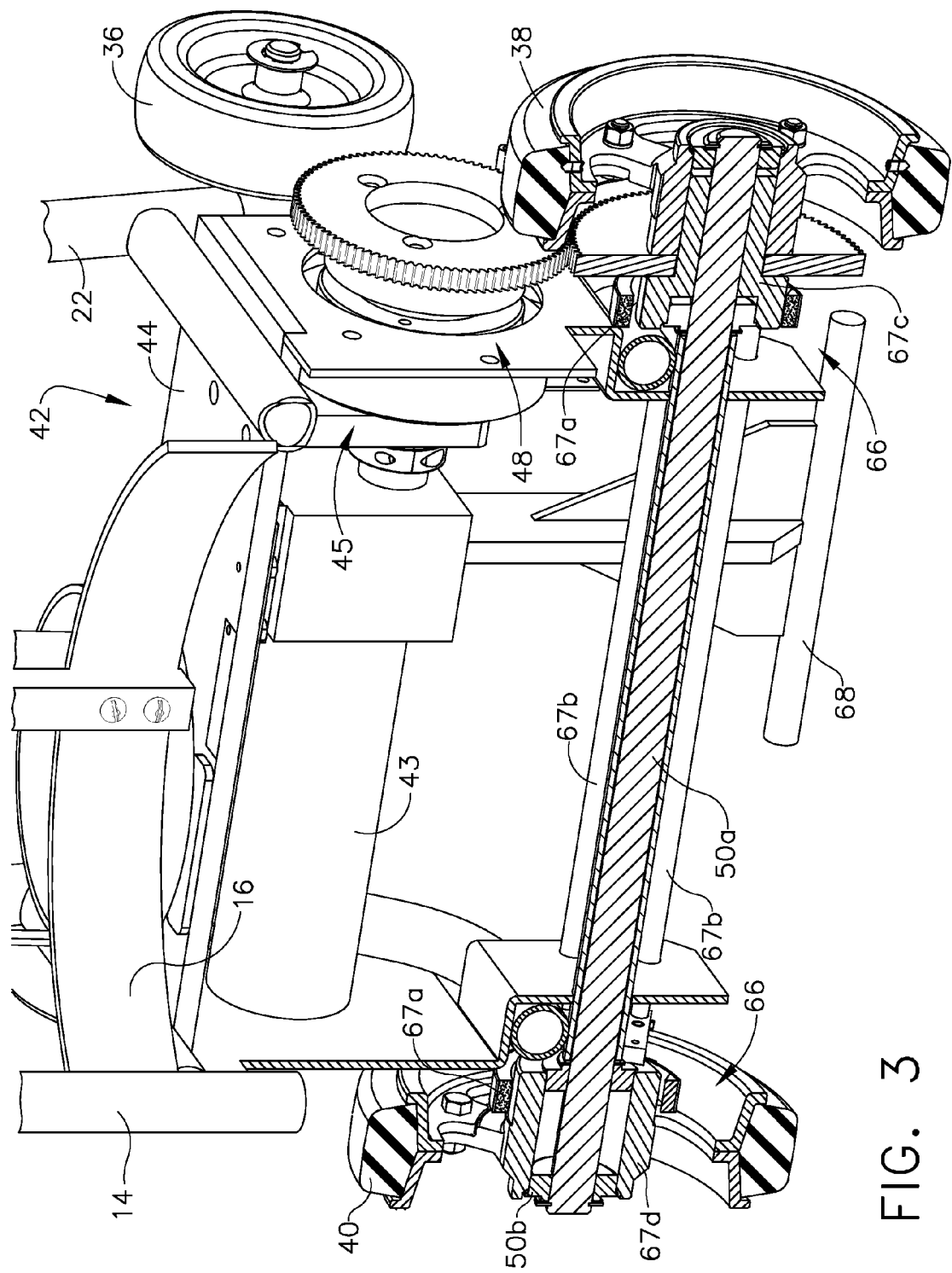
FIGS. 3 through 7 are fragmentary cross-sectional views showing a drive system of the motorized barrel cart of FIG. 1.
Figure 4:
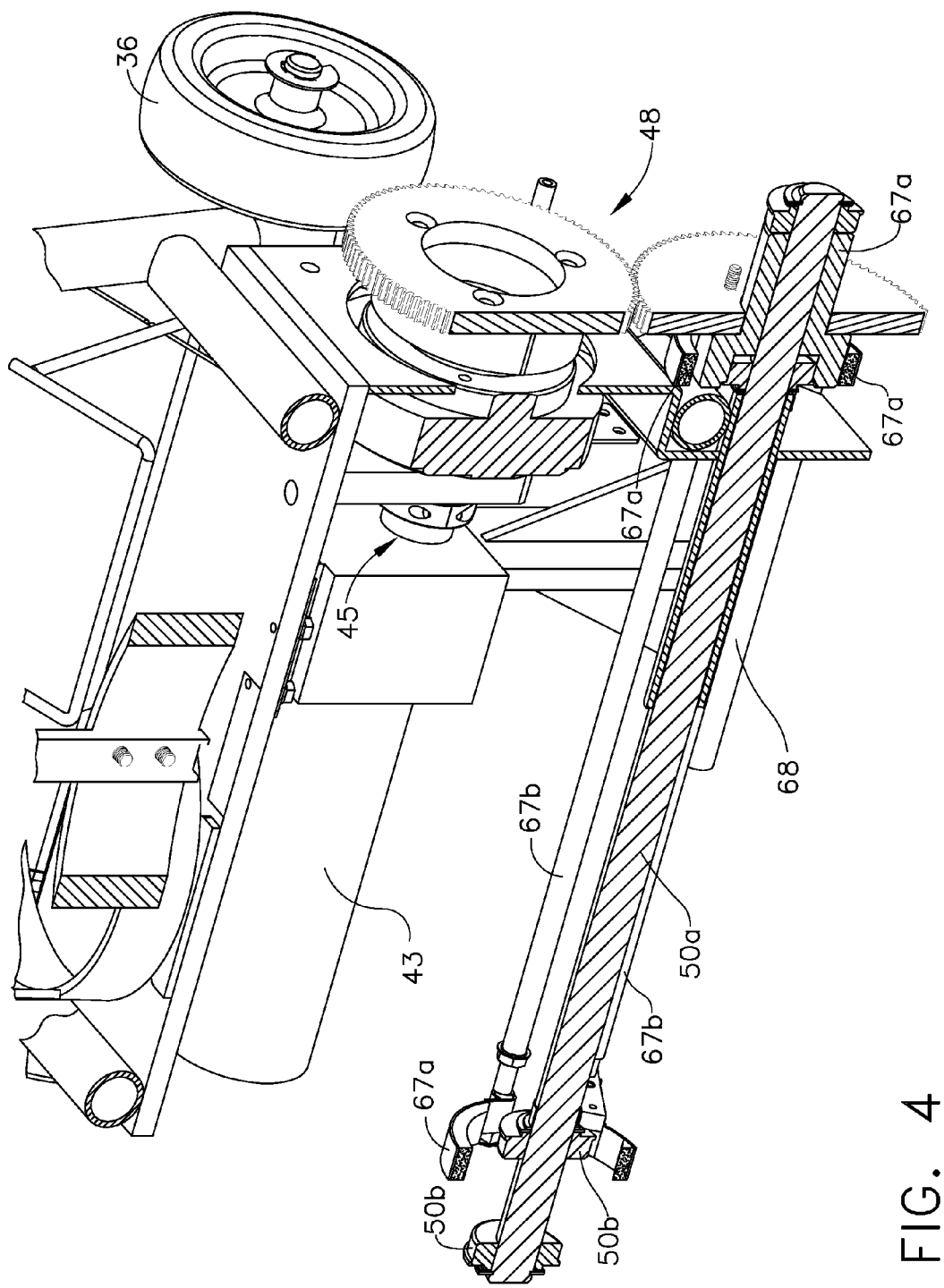
Figure 5:
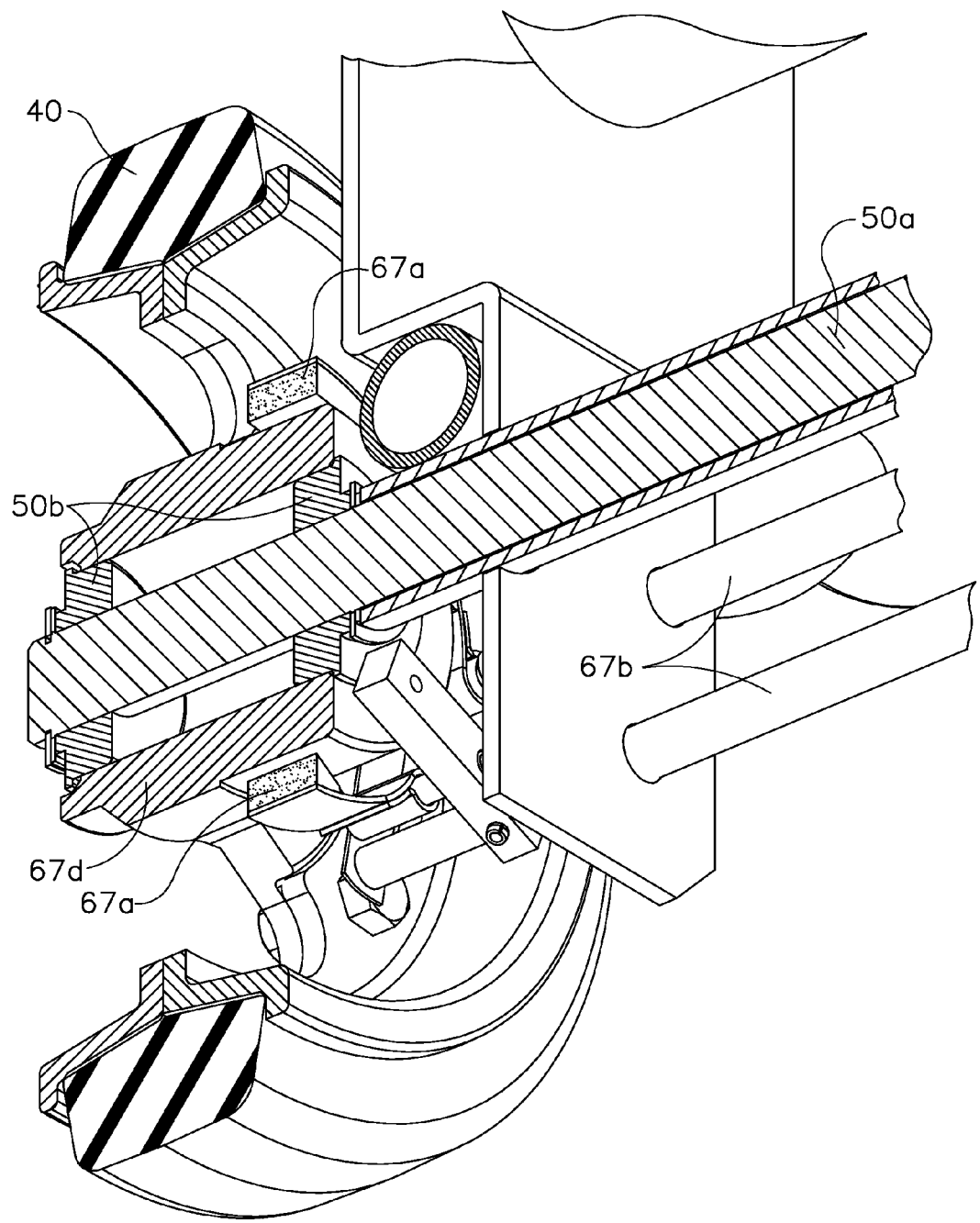
Figure 6:
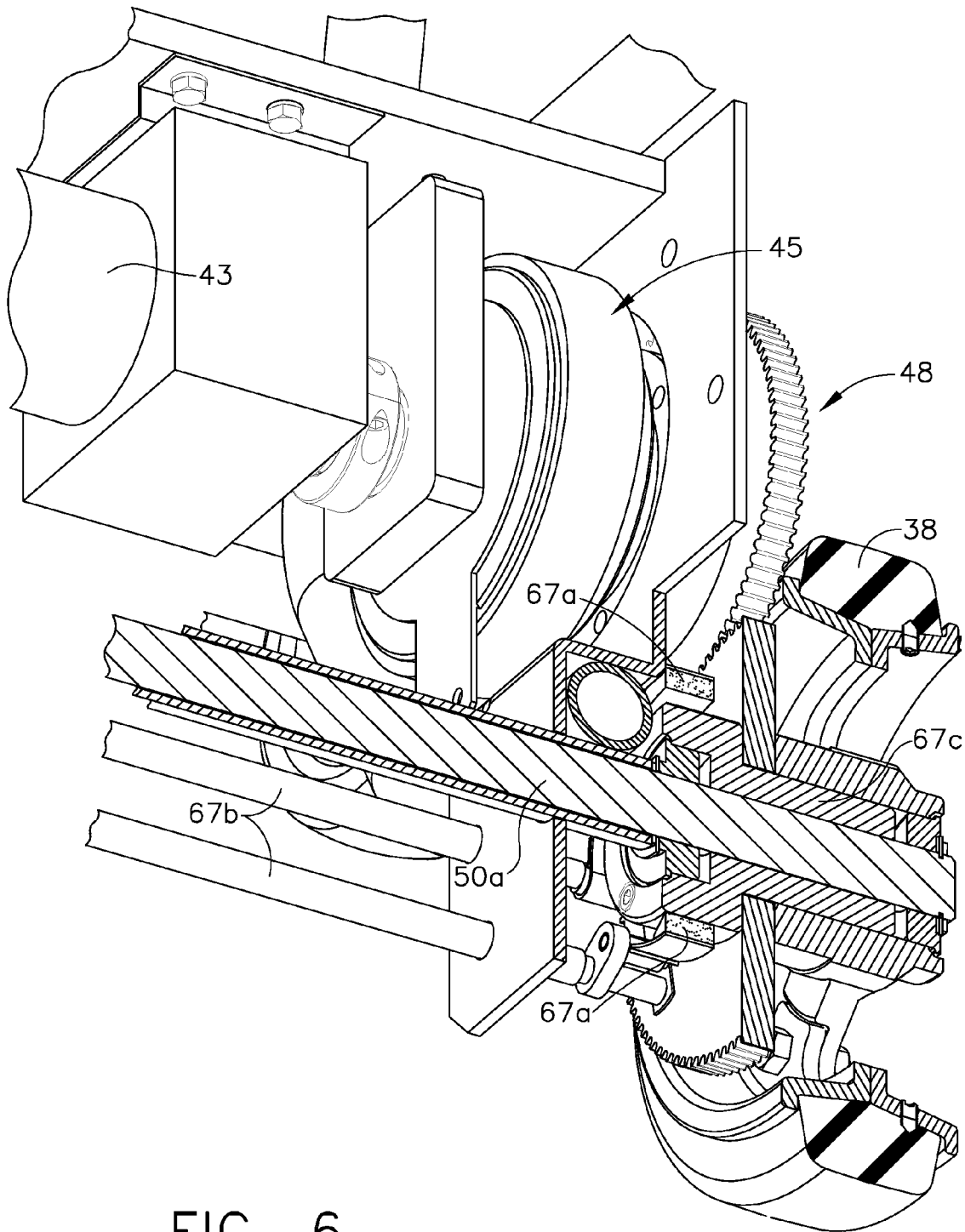
Figure 7:
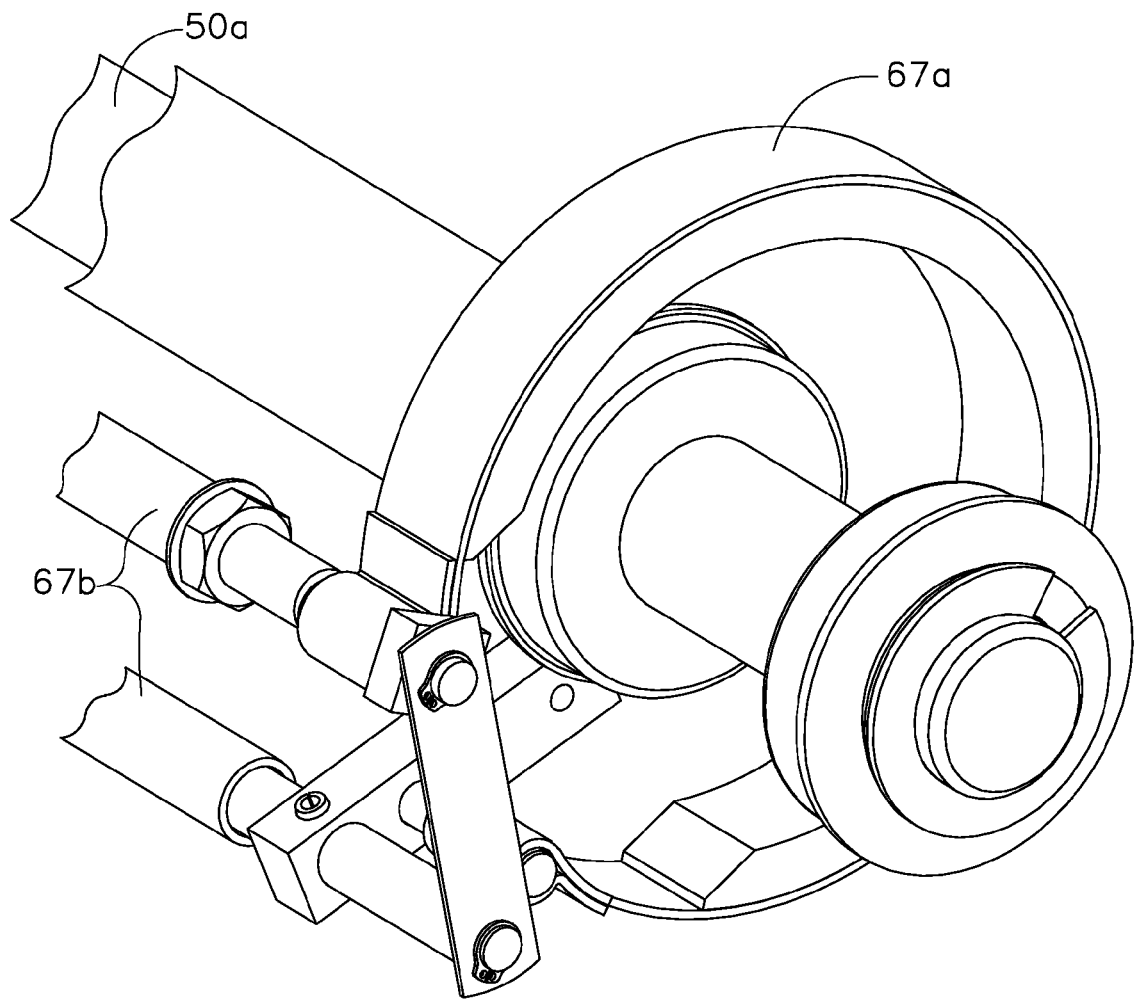

FIGS. 1 through 9 depict a barrel cart (hand truck or drum truck) 10 configured in accordance with a preferred embodiment of the invention. To facilitate the description of the cart 10, the terms "vertical," "horizontal," "front," "rear," "side," "upper," "lower," "above," "below," "right" and "left" are used in reference to the perspective of an operator during the operation the cart 10, and therefore are relative terms and should not be interpreted as otherwise limiting the scope of the invention. Furthermore, for convenience the term "drum" will be used to identify fluid containers adapted to be lifted and transported by the cart 10, though it should be understood that this term also encompasses containers that are commonly referred to as barrels.

The cart 10 is represented as utilizing a substantially conventional manual cart frame, an example of which is commercially available under the name FOUR-WHEEL EZY-ROL™ Automatic Drum Truck from Valley Craft, Inc. In this respect, the cart 10 is represented as including a frame 12 comprising a pair of front vertical frame members 14 that are interconnected with upper and lower horizontal frame members 16, as well as a front bar 18 and a rear bar 20. Each of the horizontal frame members 16 has an arcuate shape extending in a rearward direction of the frame 12 so that, in combination, the vertical and horizontal frame members 14 and 16 define a rearward-extending frame recess or concavity sized to receive a portion of a thirty to fifty-five-gallon (about 100 to about 200 liters) drum. A pair of rear vertical frame members 22 are connected to the front vertical frame members 14 near their upper ends, and are connected to the front vertical frame members 14 with side frame members 24.

Figure 8:
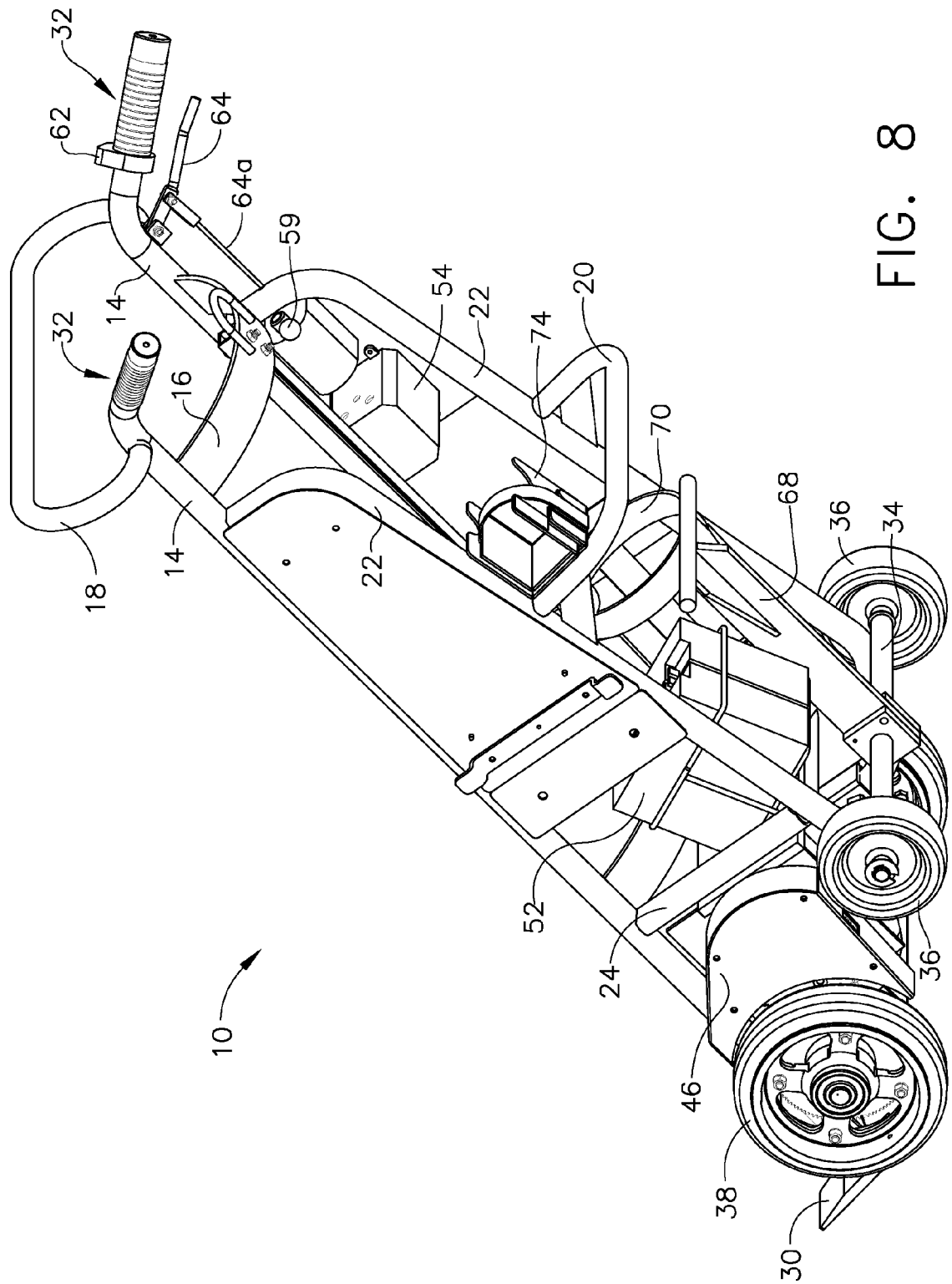
FIG. 8 is a perspective view showing the motorized barrel cart of FIG. 1 rearwardly inclined.
Figure 9:
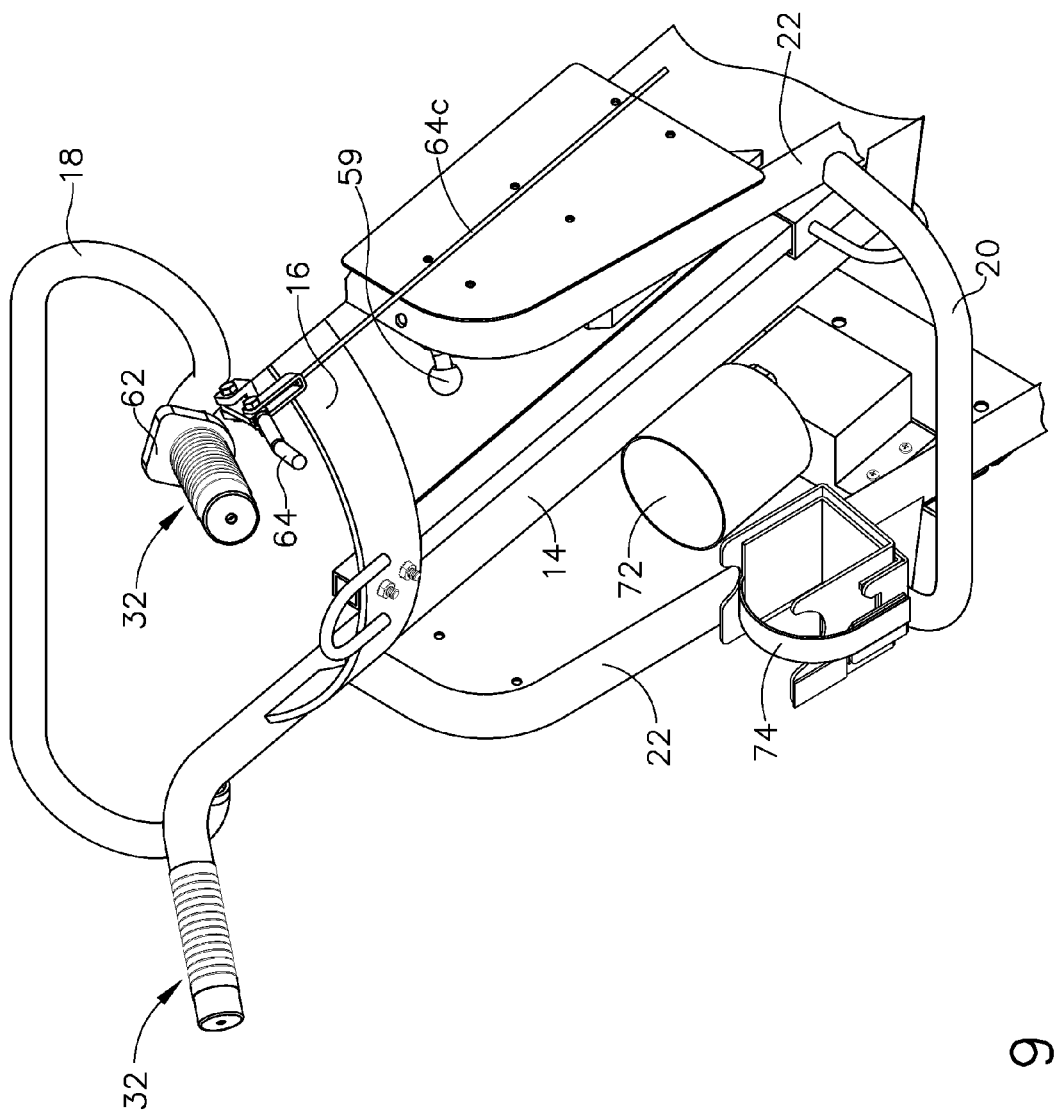
FIG. 9 is a fragmentary perspective view showing the upper end of the motorized barrel cart of FIG. 1.

For the purpose of lifting and supporting drums, barrels, and other large objects, the cart 10 is equipped with a chime hook 26 for engaging the chime of a drum (not shown), and shoes 30 located at the lower ends of the front vertical frame members 14 for engaging the bottom of a drum. The chime hook 26 is shown mounted on a vertical center post 28 attached at its upper and lower ends to the horizontal frame members 16. The hook 26 is slidably coupled to the post 28 to enable the hook 26 to be raised and lowered as necessary to engage or disengage from the chime of a drum. While a manually-operated hook 26 is depicted, it is within the scope of the invention to provide the cart 10 with a power-operated hook. In addition or in place of the hook 26, the cart could be equipped with cables or straps (not shown) to secure a drum to the cart 10. The shoes 30 are configured to be slipped beneath a drum, barrel, etc., and thereafter support the drum, barrel, etc., within the frame recess defined by the frame members 14 and 16 of the frame 12. The upper ends of the vertical frame members 14 form handles that terminate with grips 32 by which an operator can manipulate the cart 10. An axle housing 34 is shown attached to the rear vertical frame members 22 near but above the lower ends of the frame members 22. An axle (not shown) housed within the axle housing 34 mounts a pair of non-driven wheels 36 on the left and right sides of the cart 10. The wheels 36 can be formed of polyurethane or another suitably strong and chemical-resistant structural material, and in a preferred embodiment have a diameter of about six inches (about 15 cm). The non-driven wheels 36 are located above and rearward of a pair of larger wheels 38 and 40 located on opposite sides of the cart 10. Together the wheels 36, 38 and 40 provide a stable four-point support for the cart 10 and its cargo when the cart 10 is inclined rearwardly, as shown in FIG. 8. As evident from FIG. 1, the shoes 30 and wheels 38 and 40 also provide a stable four-point support for the cart 10 and its cargo when the cart 10 is upstanding (vertical) so that the non-driven wheels 36 are not supporting the cart 10.

In contrast to conventional manual barrel carts, the barrel cart 10 of this invention is configured for propelling the cart 10 while laden with a drum to reduce the possibility of injury to the operator of the cart 10. A drive system 42 is mounted to the lower ends of the rear vertical frame members 22. The drive system 42 includes a drive motor 43 enclosed within a motor housing 44, a clutch 45 enclosed within a clutch housing 46, and a drive gear assembly 48. In the embodiment shown, the wheel 38 on the left side of the cart 10 is mounted on a spindle or axle 50*a* and is directly driven by the motor 43 through the clutch 45 and drive gear assembly 48, while the wheel 40 on the right side of the cart 10 is preferably a non-driven idle wheel 40 mounted on bearings 50*b* that are mounted on the axle 50*a* of the drive wheel 38. With a single drive wheel 38, an operator is able to steer the cart 10 around objects while the clutch 45 is engaged. Suitable wheel configurations for the cart 10 include molded-on tires with diameters of about ten inches (about 25 cm), though other types of wheel constructions are foreseeable.

The motor 43 is preferably a 24-volt DC, ¼ HP, 120 rpm electric motor powered by a 24-volt DC battery pack 52. The battery pack 52 also preferably powers the clutch 45, in which case the clutch 45 is a magnetic or electric clutch. The invention is not limited to any particular types of motors, clutches, and batteries, and suitable motors, clutches, and batteries are commercially available and therefore will not be described in any further detail. The clutch 45 is preferably energized with a switch 56 mounted on a control unit housing 54 attached to one or both of the right vertical frame members 14 and 22. By energizing the clutch 45, the motor 43 is able to drive the drive wheel 38 through the engaged clutch 45 and the drive gear assembly 48. As such, when not powered by the battery pack 52, the clutch 45 is disengaged and the drive wheel 38 is freewheeling, allowing the cart 10 to be manually operated in much the same manner as a conventional barrel cart. A battery charger 60 is shown mounted to one or both of the left vertical frame members 14 and 22, allowing the battery pack 52 to be recharged without necessitating their removal from the cart 10.

A second switch 58 on the control unit housing 54 enables a speed control switch 62 to be energized to control the speed of the cart 10 when in operation. A lever 59 for controlling the rotation direction of the motor 43 is located above the switches 56 and 58 on the housing 54. The control switch 62 is located adjacent the grip 32 on the right side of the cart 10, and is preferably adapted to control the output of the motor 43. In combination, the forward/reverse directional control lever 59 and the control switch 62 enable the motor 43 to deliver variable forward and reverse rotational speeds to the drive wheel 38, and therefore variable forward and reverse (rearward) ground speeds for the cart 10. Alternatively, the control switch 62 can be adapted to control the output of the motor 43 to provide one or more set speeds for the forward and/or reverse travel directions. The control 62 can be connected to the motor 43 with electrical cables or any other suitable connection. In view of the functions of the switches 56 and 58, it should be understood that the control unit 54 is operable to selectively deliver and interrupt power from the battery pack 52 to the motor 43 and clutch 45 to enable the cart 10 to be self-propelled by the motor 43 under the control of an operator or manually propelled by an operator.

A brake lever 64 is also shown mounted adjacent the right grip 32, by which a cable 64*a* is operated to actuate a brake 66 into engagement with at least the drive wheel 38. In the embodiment shown in FIGS. 3 and 4, the brake 66 comprises two sets of brake shoes 67*a* tied together with tie rods 67*b* and adapted to engage a hub 67*c* of the drive wheel 38 at one end of the axle 50*a*, as well as a hub 67*d* of the idle wheel 40 at the opposite end of the axle 50*a*. Finally, the cart 10 is shown equipped with a kickstand 68 located at the rearward end of the frame 12 and rotatably coupled to the axle housing 34 to provide a two-position range of motion, enabling the kickstand 68 to be lowered into engagement with the surface beneath the cart 10 when the desire is to provide with the drive and idle wheels 38 and 40 at least a stable three-point support for the cart 10 when the cart 10 is upstanding, and more preferably a stable five-point support for the cart 10 as a result of the cart 10 also being supported with the shoes 30 at its forward end. The kickstand 68 can be rotated upward out of engagement with the surface beneath the cart 10 when the desire is to move the cart 10 manually or under the power of the motor 43.

Various optional features are shown in the drawings. For example, in applications such as water treatment systems and facilities in which various chemicals, gases, etc., may be dispensed from the cart 10, the cart 10 may further include bottle holders 70 and 72 (for example, for nitrogen, water, etc.) and a gauge holder 74.

In use, a drum (or other object) can be transported with the cart 10 by moving the cart 10 forward on the drive and idle wheels 38 and 40 (either self-propelled or manually propelled) until the shoes 30 are inserted beneath the lower end of the drum while simultaneously positioning the chime hook 26 so that the hook 26 will engage the chime (or other suitable feature) of the drum. During this step, the kickstand 68 can be in its lowered position to prevent the cart 10 and drum from excessively tilting rearward toward the operator. Once the drum is secured between the hook 26 and shoes 30 and nested within the frame recess defined by the frame members 14 and 16 of the frame 12, the kickstand 68 can be raised and the cart 10 tilted rearward so as to be simultaneously supported by the non-driven, drive and idle wheels 36, 38 and 40, after which the drum can be transported under the power of the drive wheel 38 and/or manually by the operator of the cart 10 by selectively energizing and de-energizing the motor 43, clutch 45 and speed control switch 62 with the switches 56 and 58. During the transportation of the drum, the brake 66 may be actuated as necessary to slow the ground speed of the cart 10. The drum can thereafter be released by reversing the order of steps described above.

While the invention has been described in terms of a preferred embodiment, it is apparent that other forms could be adopted by one skilled in the art. For example, the physical configuration of the cart 10 and its components could differ from that shown, and materials and processes other than those noted could be used. Therefore, the scope of the invention is to be limited only by the following claims.

The invention claimed is:

1. A motorized cart for lifting and transporting a drum, the cart comprising:
   a frame having upper and lower extents, a forward end and an oppositely-disposed rearward end, and a left side and an oppositely-disposed right side, the frame defining at the forward end thereof a rearward-extending frame recess sized to receive at least a one hundred liter drum;
   handles disposed at the upper extent of the frame;
   lower engaging means disposed at the forward end and the lower extent of the frame for engaging a lower end of the drum received in the frame recess and then lifting and supporting the drum within the frame recess;
   upper engaging means disposed at the forward end of the frame for engaging an upper end of the drum received in the frame recess and supported by the lower engaging means;
   first wheels disposed at the lower extent of the frame adjacent the left and right sides of the frame to define with the lower engaging means a stable multi-point support for the frame and a drum secured within the frame recess when the cart is in a vertical upstanding position and to enable insertion of the lower engaging means beneath the drum as the cart moves forward on the first wheels, the first wheels comprising at least one drive wheel disposed adjacent the left or right side of the frame;
   non-driven wheels disposed closer to the upper extent of the frame and closer to the rearward end of the frame than the first wheels, the non-driven wheels comprising left and right non-driven wheels disposed adjacent the left and right sides, respectively, of the frame to define with the first wheels at least a stable four-point support for the frame when the cart is rearwardly inclined relative to the upstanding position, wherein the non-driven wheels do not support the cart in the upstanding position; a kickstand disposed at the rearward end of the frame, the kickstand, the first wheels, and the lower engaging means defining at least a stable five-point support for the cart when the cart is in the upstanding position; a drive system comprising;
   a motor supported by the frame and adapted to drive the drive wheel, a clutch supported by the frame and adapted to selectively engage and disengage the motor with the drive wheel, and a battery supported by the frame and adapted to provide power to the motor and to the clutch;
   means for controlling the motor to vary the rotational speed and rotational direction of the drive wheel and thereby control the ground speed and travel direction, respectively, of the cart; and
   means for selectively delivering and interrupting power from the battery to the motor and to the clutch to enable the cart to be self-propelled by the motor under the control of an operator or manually propelled by an operator; wherein the controlling means is operable to control the motor to move the cart forward on the first wheels to insert the lower engaging means beneath the drum.

2. The motorized cart according to claim 1, wherein the first wheels are larger in diameter than the non-driven wheels.

3. The motorized cart according to claim 1, wherein the cart is sized to lift and transport a drum having a mass of about 450 kg.

4. The motorized cart according to claim 1, wherein the motor controlling means comprises a variable rotational speed control mounted on one of the handles of the frame for controlling the ground speed of the cart.

5. The motorized cart according to claim 4, wherein the motor controlling means comprises a rotational direction control mounted separately from the variable rotational speed control for controlling the travel direction of the cart.

6. The motorized cart according to claim 1, further comprising means for engaging the drive system to slow the ground speed of the cart.

7. The motorized cart according to claim 1, wherein the clutch is adapted to selectively engage and disengage the drive wheel.

8. The motorized cart according to claim 1, wherein one of the first wheels is not coupled to the drive wheel or to the drive system.

9. The motorized cart according to claim 1, further comprising means for supporting bottles on the frame.

10. The motorized cart according to claim 9, wherein the cart is adapted for use in a water treatment facility and the bottle supporting means comprises at least one holder for holding a bottle containing nitrogen and configured for use in the water treatment facility.

11. The motorized cart according to claim 1, wherein the frame recess is defined in part by at least two vertical frame members and at least one horizontal frame member that interconnects the vertical frame members and has an arcuate shape extending in a rearward direction of the frame so that in combination the vertical and horizontal frame members define the frame recess.

12. The motorized cart according to claim 1, wherein the upper engaging means comprises a hook slidably coupled to the frame to enable the hook to be raised and lowered for engaging and disengaging, respectively, the drum received in the frame recess.

13. The motorized cart according to claim 12, wherein the hook is adapted to engage or disengage a chime of the drum.

14. The motorized cart according to claim 1, wherein the lower engaging means comprising left and right shoes disposed adjacent the left and right sides, respectively, of the frame, and wherein the left and right shoes and the first wheels define at least a stable four-point support for the cart and a drum secured within the frame recess when the cart is in the upstanding position.

15. The motorized cart according to claim 1, wherein the cart is configured to be tilted between the stable multi-point support provided by the lower engaging means and the first wheels and the stable four-point support provided by the first wheels and the non-driven wheels.

16. A motorized cart for lifting and transporting an object, the cart comprising:
- a frame having upper and lower extents, a forward end and an oppositely-disposed rearward end, and a left side and an oppositely-disposed right side, the frame defining at the forward end thereof a rearward-extending frame recess sized to receive at least a one hundred liter object;
- handles disposed at the upper extent of the frame;
- at least two lower engaging means disposed at the forward end and the lower extent of the frame for engaging a lower end of an object received in the frame recess and then lifting and supporting the object within the frame recess;
- upper engaging means disposed at the forward end of the frame for engaging an upper end of the object received in the frame recess and supported by the lower engaging means;
- first wheels disposed at the lower extent of the frame adjacent the left and right sides of the frame to define with the lower engaging means a stable four-point support for the frame and the object secured within the frame recess when the cart is in a vertical upstanding position and to enable insertion of the lower engaging means beneath the object as the cart moves forward on the first wheels, the first wheels comprising at least one drive wheel disposed adjacent the left or right side of the frame;
- non-driven wheels disposed closer to the upper extent of the frame and closer to the rearward end of the frame than the first wheels, the non-driven wheels comprising left and right non-driven wheels disposed adjacent the left and right sides, respectively, of the frame to define with the first wheels at least a stable four-point support for the frame when the cart is rearwardly inclined relative to the upstanding position, wherein the non-driven wheels do not support the cart in the upstanding position; a kickstand disposed at the rearward end of the frame, the kickstand, the first wheels, and the lower engaging means defining at least a stable five-point support for the cart when the cart is in the upstanding position; a drive system comprising;
- a motor supported by the frame and adapted to drive the drive wheel, a clutch supported by the frame and adapted to selectively engage and disengage the motor with the drive wheel, and a battery supported by the frame and adapted to provide power to the motor and to the clutch;
- means for controlling the motor to vary the rotational speed and rotational direction of the drive wheel and thereby control the ground speed and travel direction, respectively, of the cart; and
- means for selectively delivering and interrupting power from the battery to the motor and to the clutch to enable the cart to be self-propelled by the motor under the control of an operator or manually propelled by an operator.

17. The motorized cart according to claim 16, wherein the cart is configured to be tilted between the stable four-point support provided by the lower engaging means and the first wheels and the stable four-point support provided by the first wheels and the non-driven wheels.

* * * * *